United States Patent
Jeong et al.

(10) Patent No.: US 10,510,331 B2
(45) Date of Patent: Dec. 17, 2019

(54) SOUND ABSORBING STRUCTURE FOR ANECHOIC CHAMBER AND ANECHOIC CHAMBER INCLUDING THE SAME

(71) Applicants: S.I.PAN, Gyeonggi-do (KR); KOREA RESEARCH INSTITUTE OF STANDARDS AND SCIENCE, Daejeon (KR)

(72) Inventors: Gab Cheol Jeong, Gyeonggi-do (KR); Eon Mo Ahn, Gyeonggi-do (KR); Jong Young Park, Seoul (KR); Sung Soo Jung, Sejong-si (KR)

(73) Assignees: S.I.PAN, Gyeonggi-Do (KR); KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 169 days.

(21) Appl. No.: 15/590,560

(22) Filed: May 9, 2017

(65) Prior Publication Data
US 2018/0240451 A1   Aug. 23, 2018

(30) Foreign Application Priority Data

Feb. 17, 2017  (KR) .................. 10-2017-0021487

(51) Int. Cl.
*G10K 11/168* (2006.01)
*B32B 3/26* (2006.01)
(Continued)

(52) U.S. Cl.
CPC ............ *G10K 11/168* (2013.01); *B32B 3/266* (2013.01); *E04B 1/8218* (2013.01); *E04C 2/284* (2013.01);
(Continued)

(58) Field of Classification Search
CPC ....... G10K 11/168; E04B 1/8218; E04B 1/86; E04B 1/8227; E04B 2001/8433;
(Continued)

(56) References Cited

U.S. PATENT DOCUMENTS 3,384,199 A * 5/1968 Eckel ..................... G10K 11/16
181/290
5,780,785 A * 7/1998 Eckel ........................ E04B 1/84
181/285
(Continued)

FOREIGN PATENT DOCUMENTS

CN      204356925      5/2015
CN      105040845     11/2015
(Continued)

OTHER PUBLICATIONS

English translation of JP 2006-112202, accessed Mar. 7, 2019 from JPO website.*
(Continued)

*Primary Examiner* — Jeremy A Luks
(74) *Attorney, Agent, or Firm* — IP & T Group LLP (57) ABSTRACT

This technology provides a sound absorbing structure comprising: an outer frame including an opening; a perforated plate member formed in the outer frame and including a rear surface facing the opening of the outer frame and a front surface opposite to the rear surface; and a rear sound absorber interposed between the rear surface of the perforated plate member and the opening of the outer frame, and an anechoic chamber comprising: a wall, a ceiling and a floor; and a plurality of sound absorbing structures of the embodiment fixed to at least the wall and the ceiling.

16 Claims, 7 Drawing Sheets

(51) Int. Cl.
  *E04C 2/284* (2006.01)
  *E04B 1/82* (2006.01)
  *E04B 1/86* (2006.01)

(52) U.S. Cl.
  CPC ..... *B32B 2307/10* (2013.01); *B32B 2309/105* (2013.01); *E04B 1/86* (2013.01)

(58) Field of Classification Search
  CPC ............. E04B 2001/8419; B32B 3/266; B32B 2307/10; B32B 2309/105; E04C 2/284
  USPC ........................ 181/30, 290, 292, 293, 294
  See application file for complete search history.

(56) References Cited

U.S. PATENT DOCUMENTS

| | | | |
|---|---|---|---|
| 5,975,238 A | 11/1999 | Fuchs et al. | |
| 6,073,722 A | 6/2000 | Babuke et al. | |
| 6,082,490 A * | 7/2000 | Rowland | E04B 1/8218 181/295 |
| 6,237,717 B1 * | 5/2001 | Osanai | B60R 13/0838 181/294 |
| 6,601,673 B2 * | 8/2003 | Murakami | F02B 77/13 181/204 |
| 7,520,369 B2 * | 4/2009 | Dravet | B64D 29/00 181/284 |
| 8,499,887 B2 * | 8/2013 | Gleine | B60R 13/0815 181/292 |
| 8,827,036 B2 * | 9/2014 | Lee | B60R 13/08 181/290 |
| 9,390,702 B2 * | 7/2016 | Mathur | G10K 11/162 |
| 2013/0148357 A1 * | 6/2013 | Johnston | E04B 9/32 362/253 |
| 2018/0142387 A1 * | 5/2018 | Wang | B32B 5/022 |

FOREIGN PATENT DOCUMENTS

| | | |
|---|---|---|
| JP | 60075510 | 5/1985 |
| JP | 04-018599 | 1/1992 |
| JP | 2006112202 | 4/2006 |
| JP | 2007-162227 | 6/2007 |
| JP | 3140443 | 3/2008 |
| KR | 200284847 | 8/2002 |

OTHER PUBLICATIONS

Office Action issued by the Korean Intellectual Property Office dated Feb. 27, 2018.

Office Action issued by the Korean Intellectual Property Office dated May 30, 2017.

Office Action issued by the Chinese Intellectual Property Office dated Aug. 14, 2019.

* cited by examiner

SOUND ABSORBING STRUCTURE FOR ANECHOIC CHAMBER AND ANECHOIC CHAMBER INCLUDING THE SAME

CROSS-REFERENCE TO RELATED APPLICATION

This patent document claims priority of Korean Patent Application No. 10-2017-0021487, entitled "SOUND ABSORBING STRUCTURE FOR ANECHOIC CHAMBER AND ANECHOIC CHAMBER INCLUDING THE SAME" and filed on Feb. 17, 2017, which is incorporated herein by reference in its entirety.

TECHNICAL FIELD

This patent document relates to sound absorbing structures and anechoic chambers including the same, more specifically, sound absorbing structures which can simultaneously improve the sound absorbing effect in the high frequency region and the sound absorbing effect in the low frequency region by combining a porous sound absorber with an absorber using resonance due to vibrations of a perforated plate, and also improve the sound absorbing effect in the middle frequency region by synthetizing such absorbing effects, and anechoic chambers including the same.

BACKGROUND

The phenomenon that sound spreads in the open air where reflective objects do not exist is called a free sound field. The free sound field is not generated indoors due to the reflection of sound on the wall. An anechoic chamber is a room designed to have conditions similar to the free sound field by installing an absorber or an absorbing block having a high sound absorbing ratio on walls, ceilings and/or floors of the room so as to prevent the sound generated in the room from being reflected through the walls, the ceilings and/or the floors.

The anechoic chamber can be used in a wide range of industrial fields such as aircraft parts, automobile parts, electric appliances, communication devices and medical devices. It can be also used as a space for precise measurement of sound associated with a speaker, a microphone or the like in acoustic makers or acoustical research institutes.

The sound absorber installed in the anechoic chamber absorbs noises generated by the operation of the product in the anechoic chamber, thereby preventing noises from being reflected. For preventing the reflection of noises, the sound absorber used in the anechoic chamber should have a very high sound absorbing ratio, usually the normal incidence sound absorbing ratio of 0.99 or more, and conservatively the normal incidence sound absorbing ratio of 0.9 or more.

The common absorbers used in the anechoic chamber are wedges having a triangular shape protruding toward the inside of the anechoic chamber.

Figure 1:
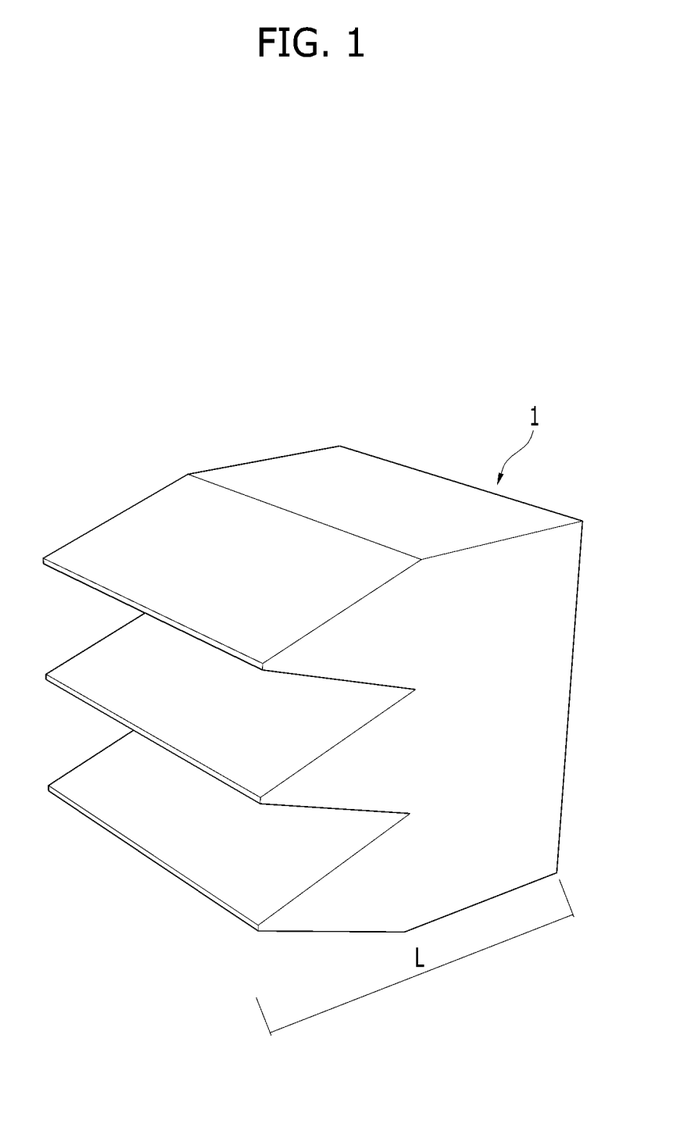
FIG. 1 is a schematic view of an example of a wedge.
Figure 2:
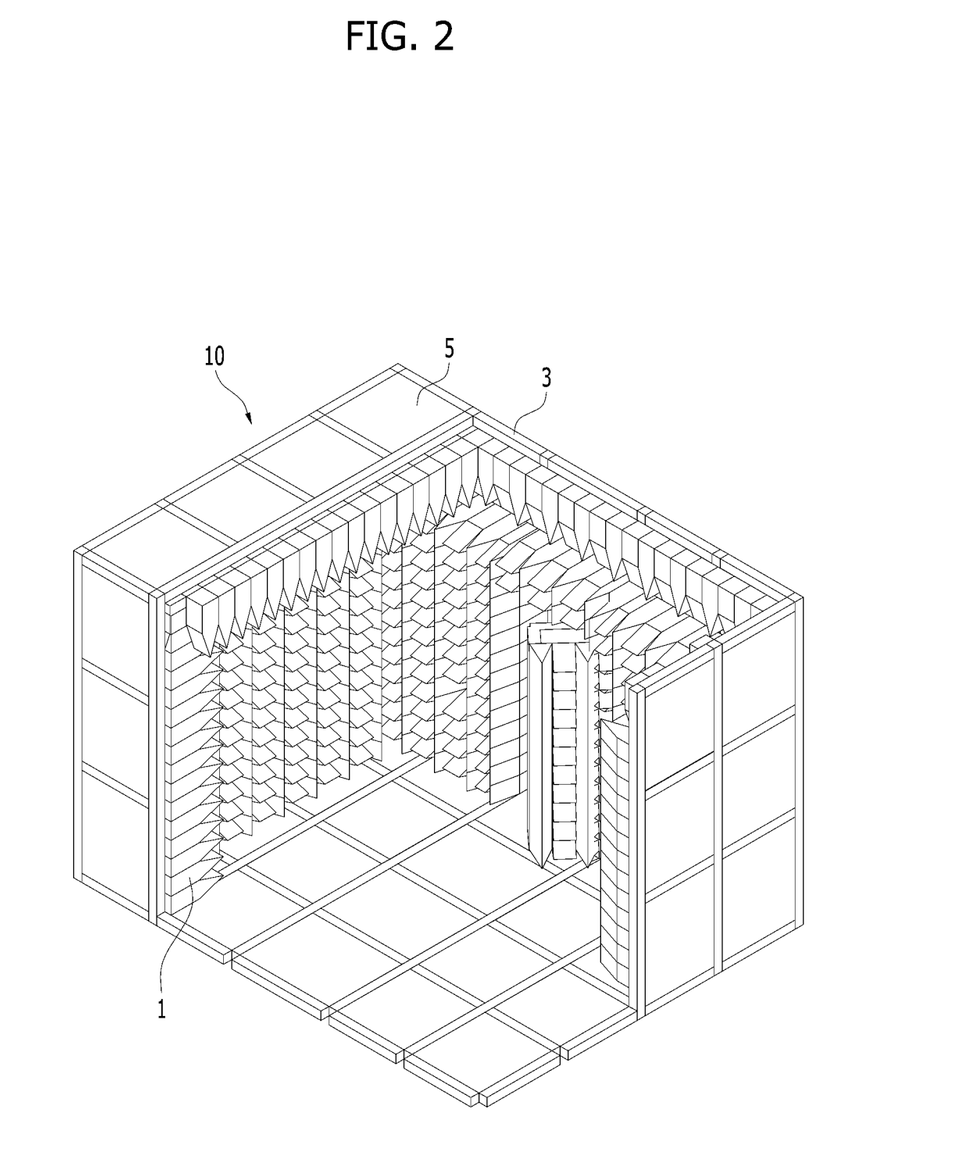
FIG. 2 is a schematic view of an example of an anechoic chamber where the wedges are installed.

FIG. 1 is a schematic view of an example of wedges, and FIG. 2 is a schematic view of an example of an anechoic chamber where the wedges are installed.

Referring to FIG. 1, a wedge 1 used in the common anechoic chamber may be formed of an absorbing material. Examples of the absorbing material may include a porous sound absorber such as glass wool, foamed urethane and the like. The wedge 1 may be formed on walls, a ceiling and/or a floor of an anechoic chamber 10 and exhibit the sound absorbing effect. Referring to FIG. 2, the anechoic chamber 10 may include a square pipe 3 formed on the at least one wall, the ceiling and the floor in a grid shape, a sound insulating panel 5 formed in a space between the square pipes 3 and a wedge 1 formed on the sound insulating panel 5.

A length L of the wedge 1 may be determined according to the cut off frequency to create a free sound field and be usually ¼ wavelength. The length of the wedge 1 required according to the cut off frequency is calculated as follows:

TABLE 1

| | Cut off frequency (Hz) | | | | | | | | | |
|---|---|---|---|---|---|---|---|---|---|---|
| | 40 | 50 | 63 | 80 | 100 | 125 | 163 | 200 | 250 | 315 |
| ¼ wavelength (m) (length of the wedge) | 2.1 | 1.7 | 1.35 | 1.06 | 0.85 | 0.68 | 0.52 | 0.43 | 0.34 | 0.27 |

However, since the maximum length of the wedge 1 is about 1.5 m, it is impossible to fabricate the absorber at the length longer than about 1.5 m used as the wedge 1. Further, the wedge 1 having the length longer than about 1.5 m cannot be practically used because it is bent due to its own weight after installation on the wall. In case of the wedge 1 having the maximum length of about 1.5 m, the cut off frequency is limited to about 63 Hz. Therefore, it is impossible to implement the sound absorbing effect at the frequency lower than about 63 Hz by using the wedge 1. As a result, it is difficult to form the anechoic chamber having the cut off frequency of 50 Hz or less which is required for an automobile field or an engine field by using the common wedge 1. Moreover, if the length of the wedge 1 becomes longer, there may be a problem that the space occupied by the wedge is increased and the actual available space is reduced.

Meanwhile, the sound absorber may be classified into three types, that is, a porous sound absorber, a resonance sound absorber and a plate-type sound absorber according to the method and the technical feature of sound absorption.

The porous sound absorber has a plurality of small bubble-like pores or a fibrous structure on the surface of the absorber and inside the absorber, so that it is vibrated by the sound waves of air. As a result of such vibration, friction between materials may occur and sound energy may be converted into heat energy and absorbed. The main sound absorption range of the porous sound absorber may be the high-frequency range of 250 Hz or more. The porous sound absorber may be formed of glass wool, rock wool, foamed resin materials, and fabrics, and so on.

The resonance sound absorber uses a principal of Helmholtz Resonators and is a container of gas (usually air) with an open hole (or neck or port). A volume of air in and near the open hole vibrates because of the 'springiness' of the air inside. When the sound wave with a resonance frequency arrives, it is possible to absorb acoustic energy due to viscous resistance of the open hole. The main sound absorption range of the resonance sound absorber may be the middle frequency range of 125 Hz to 250 Hz. The resonance sound absorber may include a perforated plate having an air layer formed on the rear side of the plate.

The plate-type sound absorber uses resonance due to vibration of the plate. The plate-type sound absorber may exhibit the sound absorbing effect by converting acoustic energy into vibrational energy when a sound wave vibrates the plate. The main sound absorption range of the sound absorber using resonance due to vibration of the plate may be the low frequency range of 125 Hz or less. The plate-type sound absorber may be formed of a metal plate, a vinyl film, and a gypsum wallboard, and so on.

The wedge used in the anechoic chamber may be formed of the porous sound absorber. In this case, in order to increase the sound absorbing ratio at the cut off frequency of 100 Hz or less, the length of the wedge should become longer. However, considering the limited size of the anechoic chamber, increasing the length of the wedge is limited so that it is practically impossible to achieve the sound absorbing effect in the low frequency region with the porous sound absorber.

In case of the resonance sound absorber, theoretically, in order to obtain the sound absorbing effect in the low frequency region, the lower the frequency, the thicker the air layer behind the perforated plate. However, like the porous sound absorber, considering the limited size of the anechoic chamber, increasing the thickness of the air layer is limited so that it is practically impossible to achieve the sound absorbing effect in the low frequency region with the resonance sound absorber.

Meanwhile, the plate-type absorber may be used for sound absorption in the low frequency region and the size, thickness, material and the like are the main factors that determine the sound absorbing effect. A resonance frequency $f_0$ can be calculated as follow:

$$f_0 = \frac{c}{2\pi}\sqrt{\frac{\rho}{ML}}$$

wherein:
M: Mass per unit area of plate ($kg/m^2$),
L: Thickness of rear air layer (m),
$\rho$: Density of air ($kg/m^3$),
c: Sound velocity of air (m/s).

According to the above formula, the resonance frequency $f_0$ of the plate-type absorber may vary depending on the mass per unit area of plate M, and the mass per unit area of plate M may vary depending on the thickness of the plate. Accordingly, in order to adjust the resonance frequency of the plate-type absorber, it is required to change the thickness and size of the plate-type absorber. However, since the plate is usually formed of metals, increasing the weight and size is limited so that controlling the resonance frequency is limited.

Patent Literature 1 discloses a plate-type absorber that uses resonance due to vibration of the plate, and Patent Literature 2 discloses an anechoic chamber including such a plate-type absorber.

However, since the plate-type absorber disclosed in Patent Literatures 1 and 2 uses resonance due to vibration of a metal plate, the weight or size of the metal plate is limited so that controlling the resonance frequency is limited.

Moreover, the plate-type absorber disclosed in Patent Literatures 1 and 2 includes the metal plate and a rear polymer board. The metal plate should be bonded to the rear polymer board via adhesion and the like. However, since most porous sound absorbers used as the rear polymer board tend to fall off easily due to the weight of the rear polymer board itself when attached to the metal plate, the sound absorber used as the rear polymer board that can be bonded to the metal plate is very limited. For this reason, in Patent Literatures 1 and 2, the rear polymer board that can bonded to the metal plate is limited to melamine resin foam that can prevent falling due to the weight.

Further, in the plate-type sound absorber, the edges of the metal plate should be fixed consistently. If the porous sound absorbers located on or below the metal plate press the metal plate, the sound absorbing ratio may change. As a result, when the plate-type absorbers are installed on the walls and on the ceilings or floors, respectively, they may exhibit different sound absorbing ratios.

Therefore, it is still required to develop techniques for a novel anechoic chamber that can overcome drawbacks of the common wedges or plate-type absorbers using the metal plate.

CITATION LIST

Patent Literature

Patent Literature 1: U.S. Pat. No. 5,975,238 (1999 Nov. 2.)
Patent Literature 2: U.S. Pat. No. 6,073,722 (2000 Jun. 13.)

SUMMARY

The present invention is to provide sound absorbing structures which can simultaneously improve the sound absorbing effect in the high frequency region and the sound absorbing effect in the low frequency region by combining a porous sound absorber with an absorber using resonance due to vibrations of a perforated plate, and also improve the sound absorbing effect in the middle frequency region by synthetizing such absorbing effects, and anechoic chambers including the same.

In one aspect, a sound absorbing structure in accordance with an embodiment of the present invention may include an outer frame including an opening; a perforated plate member formed in the outer frame and including a rear surface facing the opening of the outer frame and a front surface opposite to the rear surface; and a rear sound absorber interposed between the rear surface of the perforated plate member and the opening of the outer frame.

Embodiments of the above sound absorbing structure may include one or more the following:

The sound absorbing structure may further include a front sound absorber interposed between the front surface of the perforated plate member and the outer frame. The front sound absorber may include a porous sound absorber. The porous sound absorber may include one or more selected from the group consisting of an inorganic fiber, an organic fiber, a chemical fiber, a foamed resin material and a sprayed fiber material. The front sound absorber may have a thickness greater than 0 mm and up to 350 mm. The sound absorbing structure may further include a protective layer surrounding the front sound absorber. The rear sound absorber may include a porous sound absorber. The rear sound absorber may include one or more selected from the group consisting of an inorganic fiber, an organic fiber, a chemical fiber, a foamed resin material and a sprayed fiber material. The rear sound absorber may have a thickness of 50 to 250 mm. The sound absorbing structure may further include a protective layer surrounding the rear sound absorber. The perforated plate member may include one or more selected from the group consisting of a metal plate, a gypsum board, an asbestos cement board, a hard board, plywood, a wood wool board and a synthetic resin plate. The perforated plate member may have a ratio of a total area of pores to an area of the plate of 1 to 15%. The perforated plate member may further include a cap for holding a pore height, wherein the cap for holding the pore height has a hollow shape and has a height which is equal to or greater than the pore height. The outer frame may include a porous plate in which pores are formed in the plate. The outer frame may have a ratio of a total area of pores to an area of the plate of 30 to 50%. The sound absorbing structure may have a plate shape. The perforated plate member may absorb sound due to resonance caused by vibration of the plate.

In another aspect, an anechoic chamber may include a wall, a ceiling and a floor; and a plurality of sound absorbing structures in accordance with the embodiment of the present invention fixed to at least the wall and the ceiling.

Embodiments of the above anechoic chamber may include one or more the following:

The plurality of sound absorbing structures are fixed to all of the wall, the ceiling and the floor.

These and other aspects, implementations and associated advantages are described in greater detail in the drawings, the description and the claims.

Advantageous Effects

Sound absorbing structures in accordance with the embodiments of the present invention can simultaneously improve the sound absorbing effect in the high frequency region and the sound absorbing effect in the low frequency region by combining a porous sound absorber with an absorber using resonance due to vibrations of a perforated plate, and also improve the sound absorbing effect in the middle frequency region by synthetizing such absorbing effects. In particular, the sound absorbing structure can exhibit the sound absorbing effect in the low frequency region due to the resonance effect caused by vibration of a perforated plate member and the effect of a rear sound absorber for enhancing the resonance effect and increasing sound absorption at the resonance frequency and in the frequency region near the resonance frequency. Further, the sound absorbing structure can exhibit the sound absorbing effect in the high frequency region due to the effect of a front sound absorber and also improve the sound absorbing effect in the middle frequency region by synthetizing such absorbing effects.

Particularly, in accordance with the embodiments of the present invention, since the noise attenuation effect at the desired frequency in the low frequency region is controlled by using resonance due to the vibration of the perforated plate member, the resonance frequency can be changed via easy and simple methods, for example, by changing the diameter of the pore and porosity of the perforated plate member so that the sound absorbing effect at the targeted frequency can be maximized.

Further, in accordance with the embodiments of the present invention, there is no restriction on the type of a porous sound absorber that can be applied to the anechoic chamber and a constant sound absorbing ratio can be obtained, thereby ensuring uniform performances of the anechoic chamber.

Moreover, since the sound absorbing structure in accordance with the embodiments of the present invention is formed in a plate shape, when applied to the anechoic chamber, the length of the sound absorbing structure is reduced in comparison with the common wedge-type absorber, thereby allowing efficient use of the internal space.

Also, in a plurality of sound absorbing structures that are applied to the anechoic chamber, it is possible to form the front sound absorbers to have different thicknesses from each other and to form the rear sound absorbers to have different thicknesses from each other. Therefore, acoustic characteristic such as the size of the anechoic chamber or existence of room modes can be adjusted in a simple and easy manner by varying the placement of the sound absorbing structures having different thicknesses. As a result, it is possible to effectively meet the conditions of the free sound field.

DETAILED DESCRIPTION

Various examples and implementations of the disclosed technology are described below in detail with reference to the accompanying drawings.

Hereinafter, the present invention will be described in detail by way of exemplary embodiments of the invention such that the scope and spirit of the inventive concept are easily constructed by one of ordinary skill in the art. Although lots of specific particulars such as concrete configurations are disclosed in description below, such particulars are provided to aid in overall understanding and it is obvious to those of ordinary skill in the art that the present invention may be constructed without such particulars. In addition, while describing the embodiments, detailed descriptions of related well-known functions or configurations that may diminish the clarity of the points of the embodiments of the present invention are omitted.

Figure 3:
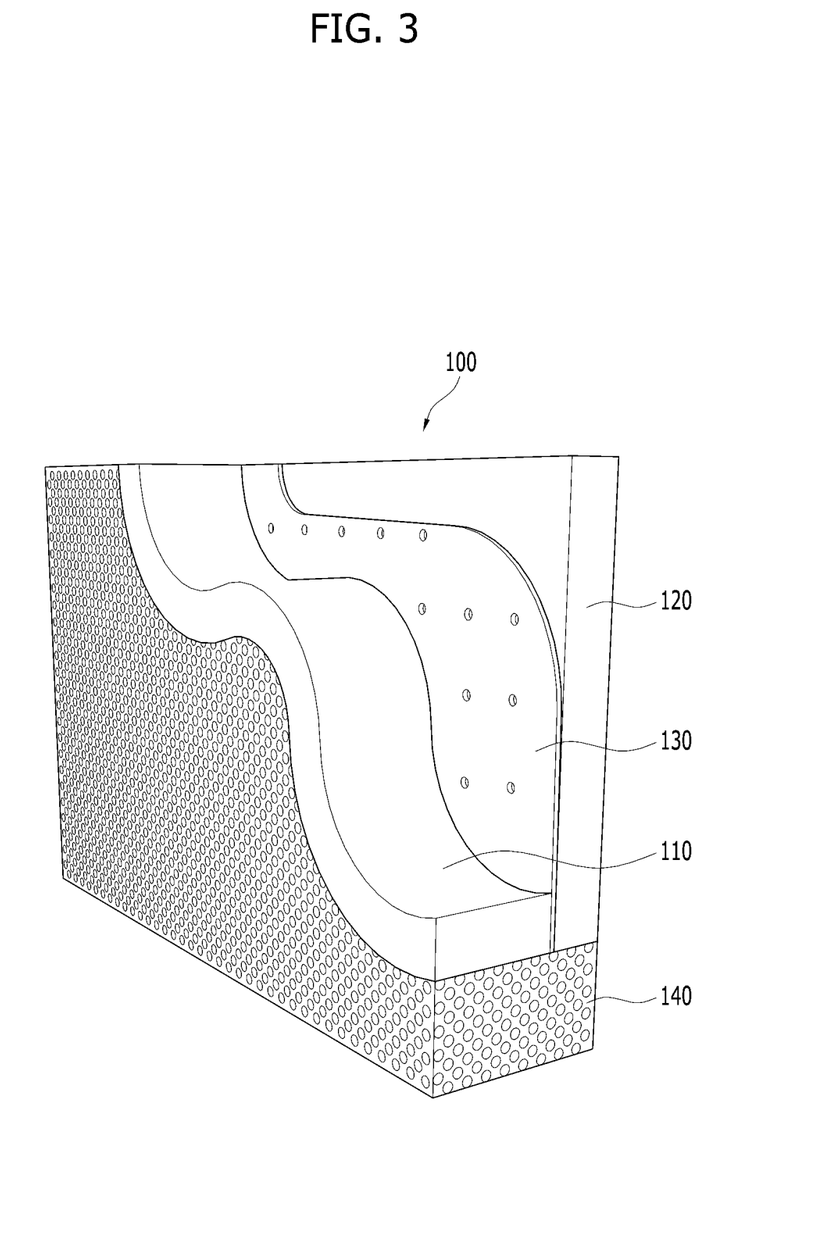
FIG. 3 is a schematic view of a sound absorbing structure in accordance with an embodiment of the present invention.

FIG. 3 is a schematic view of a sound absorbing structure in accordance with an embodiment of the present invention.

Referring to FIG. 3, a sound absorbing structure 100 in accordance with the embodiment of the present invention may include an outer frame 140 including an opening; a perforated plate member 130 formed in the outer frame 140 and including a rear surface facing the opening of the outer frame 140 and a front surface opposite to the rear surface; a front sound absorber 110 interposed between the front surface of the perforated plate member 130 and the outer frame 140; and a rear sound absorber 120 interposed between the rear surface of the perforated plate member 130 and the opening the outer frame 140.

The front sound absorber 110 may be disposed on the front surface of the perforated plate member 130, and the rear sound absorber 120 may be disposed on the rear surface of the perforated plate member 130. The rear surface of the perforated plate member 130 may be a surface facing the opening of the outer frame 140, and the front surface of the perforated plate member 130 may be a surface opposite to the rear surface. When the sound absorbing structure 100 is fixed to a wall, a ceiling and/or a floor, the opening of the outer frame 140 faces the wall, the ceiling and/or the floor. Accordingly, the rear sound absorber 120 may be disposed between a surface of the wall, the ceiling and/or the floor where the sound absorbing structure 100 is fixed and the perforated plate member 130, while the front sound absorber 110 may be disposed between the perforated plate member 130 and the outer frame 140 opposite to the opening.

The front sound absorber 110 may serve to absorb sound in the high frequency region, for example, at a frequency of 250 Hz or more.

The front sound absorber 110 may include a porous sound absorber.

The porous sound absorber has a plurality of pores in the shape of small bubbles or thin tubes on the surface of the absorber and inside the absorber. Air in the pores may be vibrated by the sound waves to generate friction and sound energy is converted into thermal energy due to the friction and absorbed. The sound absorption performance may vary depending on porosity or the thickness of the sound absorber.

Examples of the porous sound absorber which can be used for the front sound absorber 110 may include an inorganic fiber such as glass wool, rock wool, ceramic wool, and the like, an organic fiber such as felt and the like, a chemical fiber such as polyester wool and the like, a foamed resin material such as polyurethane, melamine and the like and a sprayed fiber material, but are not limited thereto.

The thickness of the front sound absorber 110 may be greater than 0 mm and 350 mm or less, preferably 150 mm to 350 mm. If the thickness of the front sound absorber 110 is greater than 350 mm, the front sound absorber 100 itself can exhibit the sound absorbing ratio of 0.95 or more in the frequency region of 250 Hz or more so that it is not necessary to combine the sound absorber using resonance due to vibration of a plate.

Meanwhile, if sound absorption is not required in the frequency region of 250 Hz or more, in the sound absorbing structure 100 in accordance with the embodiment of the present invention, the front sound absorber 110 may be omitted. The sound absorbing structure 100 may be used to control the sound field of a large room such as a large hall or theater. In this case, if sound absorption is desired only in the frequency region less than 250 Hz while the acoustic performance at the frequency of 250 Hz or more is not changed, the front sound absorber 110 may not be included in the sound absorbing structure 100. The sound absorbing structure 100 in which the front sound absorber 110 is not formed is shown in FIG. 4.

Figure 4:
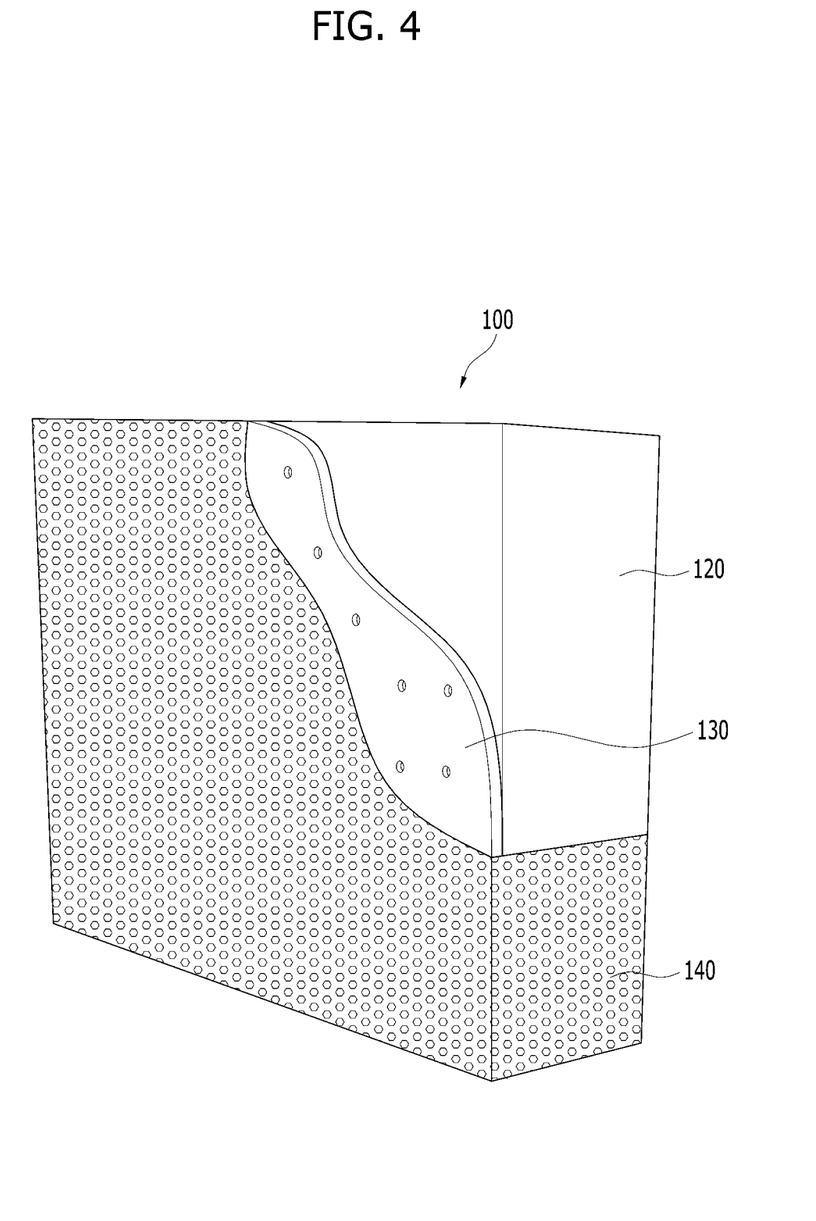
FIG. 4 is a schematic view of a sound absorbing structure in accordance with another embodiment of the present invention.

Referring to FIG. 4, a sound absorbing structure 100 in accordance with another embodiment of the present invention may include an outer frame 140 including an opening; a perforated plate member 130 formed in the outer frame 140 and including a rear surface facing the opening of the outer frame 140 and a front surface opposite to the rear surface; and a rear sound absorber 120 interposed between the rear surface of the perforated plate member 130 and the opening of the outer frame 140. The sound absorbing structure 100 of FIG. 4 is substantially the same as the sound absorbing structure 100 of FIG. 3 except that it does not include the front sound absorber 110.

Referring back to FIG. 3, the front sound absorber 110 may be formed in a plate shape, for example, in a plate shape such as a square plate or a rectangular plate.

Although they are shown, a protective layer surrounding the front sound absorber 110 may be further included in the surface of the front sound absorber 110 in order to prevent scattering of the porous sound absorber. The protective layer may be formed of a glass fiber fabric, a polyester film and the like, but is not limited thereto.

The perforated plate member 130 may be interposed between the front sound absorber 110 and the rear sound absorber 120. That is, the perforated plate member 130 may include the rear surface facing the opening the outer frame 140, and the front surface opposite to the rear surface, and the front sound absorber 110 may be formed on the front surface of the perforated plate member 130 and the rear sound absorber 120 may be formed on the rear surface of the perforated plate member 130.

The perforated plate member 130 may serve to absorb sound at the low frequency region, for example, at the frequency of 125 Hz or less by resonance due to the vibration of the plate. When sound waves enter the pore of the perforated plate member 130, the energy of the sound waves may vibrate air inside the pore to generate resonance. At this time, the energy of the sound waves may be converted into kinetic energy of air molecule and absorbed.

As the perforated plate member 130, existing porous plates may be used. Alternatively, the perforated plate member 130 may be formed by perforating metal plates. Examples of the plate member which can be used for the perforated plate member 130 may include a metal plate such as an aluminum plate or an iron plate, a gypsum board, an asbestos cement board, a hard board, plywood, a wood wool board, a synthetic resin plate and the like, but are not limited thereto.

For the perforated plate member 130, it is important to design the pore size, porosity and thickness in order to set the resonance frequency to be 125 Hz or less so as to efficiently absorb sound in the desired low frequency region. This will be explained in detail with reference to FIGS. 5 to 7.

Figure 5:
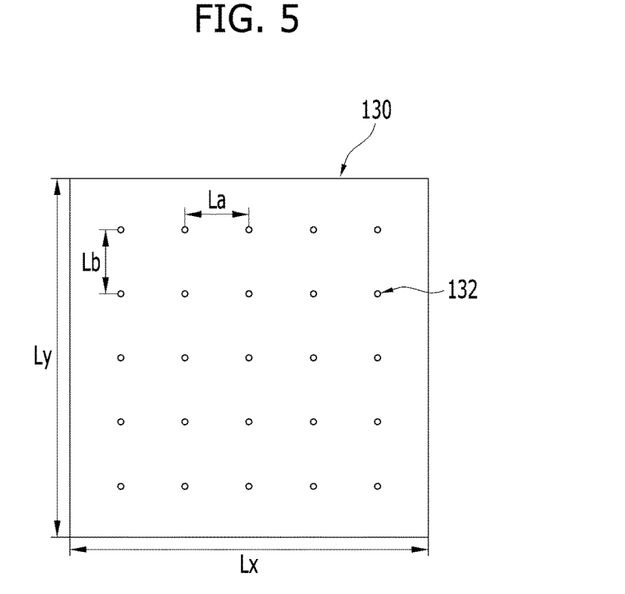
FIG. 5 is a schematic view of a cross-section of a perforated plate member in accordance with an embodiment of the present invention.

FIG. 5 is a schematic view of a cross-section of a perforated plate member in accordance with an embodiment of the present invention.

Referring to FIG. 5, the perforated plate member 130 may include a plurality of pores 132. The fundamental resonance frequency ($f_{p0}$) of the perforated plate member 130 may be calculated as follows:

$$f_{p0} = \sqrt{(9D\pi^2/4h\rho\xi^4)} \sqrt{\xi^2 L_x^2 + 3\xi^2 L_y^2 + 2\xi^2 + 2\xi^2(1-\sigma^2)}$$

-continued $$\xi = \frac{(1-\mu)L_a L_b L_x L_y}{\pi r^2}$$

wherein:
D: Flexural rigidity of plate
h: Thickness of plate
ρ: Volume density of plate
σ: Poisson's ratio of plate
μ: Porosity (ratio of a total cross-sectional area of pores to a cross-sectional area of plate)
r: Radius of pore As confirmed in the above formula, it is possible to readily set the fundamental resonance frequency ($f_{p0}$) of the perforated plate member 130 to be 125 Hz or less by adjusting the thickness of the perforated plate member 130, the porosity and the diameter of the pore.

The porosity of the perforated plate member 130, that is, the ratio of the total area of pores 130 to the area of the plate member may be preferably 1 to 15%. If the porosity of the perforated plate member 130 is less than 1%, it is difficult to design a resonator in view of the area of the plate member 130. If the porosity of the perforated plate member 130 is greater than 15%, the effect of the resonator may be significantly decreased.

The diameter of the pore and the spacing between the pores may be determined according to the porosity of the perforated plate member 130 and thus, suitably selected so as to satisfy the porosity.

The pore may be formed in various cross-sectional shapes, for example a circle, a square, a rectangle and the like, but the shapes are not limited thereto.

The perforated plate member 130 may be formed in a plate shape, for example in a plate shape such as a square plate or a rectangular plate.

The thickness of the perforated plate member 130 may vary depending on a material of the plate. For example, when the perforated plate member 130 is formed of metal plates, the thickness of the plate may be in a range of 0.5 to 3 mm, and when the perforated plate member 130 is formed of synthetic plastics, the thickness of the plate may be in a range of 1 to 6 mm. However, the thickness of the perforated plate member 130 is not limited thereto.

In particular, in designing the resonance frequency, it is important to keep the height of the pores 132 of the perforated plate member 130 uniform. Thus, it may be required to prevent the air layer in the pores 132 from being blocked by the front sound absorber 110 and the rear sound absorber 120 disposed around the pores 132. When the perforated plate member 130 is formed of a non-metal plate having a thickness of 6 mm or more such as a gypsum board, a wood wool board and the like, the height of the pores 132 can be uniformly maintained. However, when the perforated plate member 130 is formed of a metal plate, since the thickness of the metal plate is very thin, for example, to about 1 mm, the front sound absorber 110 and the rear sound absorber 120 disposed around the pores 132 may block the air layer in the pores. A method for solving such a problem will be described in detail with reference to FIGS. 6 and 7.

Figures 6, 7:
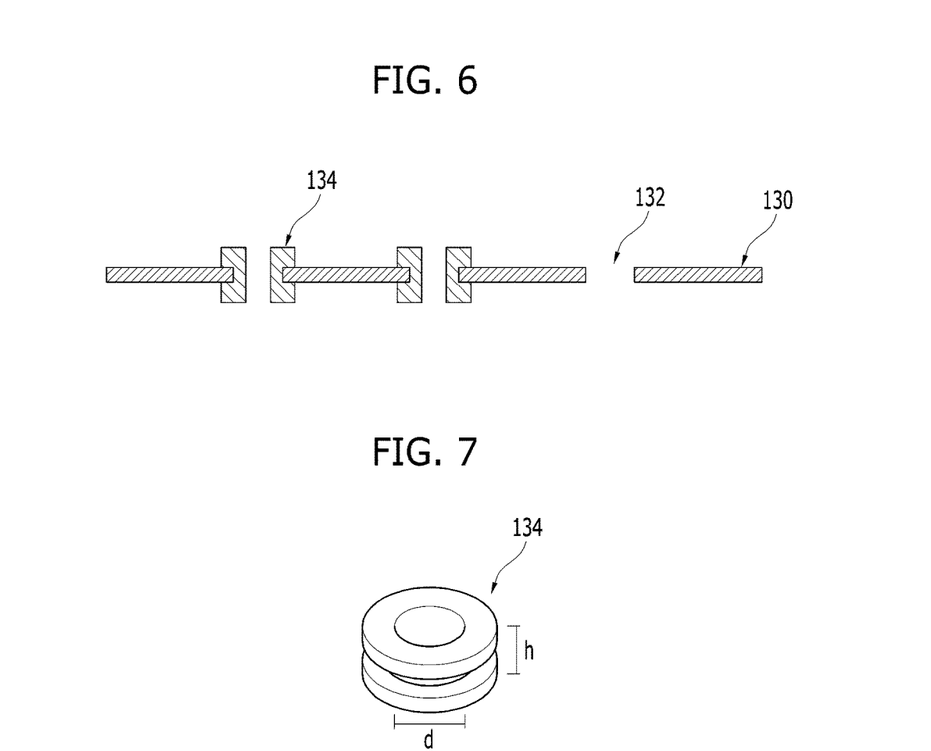
FIG. 6 is a schematic view of a cross-section of a perforated plate member to which a cap for holding a pore height is applied in accordance with an embodiment of the present invention.
FIG. 7 is a schematic view of a cap for holding a pore height in accordance with an embodiment of the present invention.

FIG. 6 is a schematic view of a cross section of a perforated plate member to which a cap for holding a pore height is applied in accordance with an embodiment of the present invention, and FIG. 7 is a schematic view of the cap for holding a pore height in accordance with an embodiment of the present invention.

Referring to FIG. 6, in order to prevent the air layer in the pores 132 from being blocked by the front sound absorber 110 and the rear sound absorber 120 disposed around the pores 132, the perforated plate member 130 may further include a cap for holding a pore height 134 to uniformly maintain the height of the pores 132.

As shown in FIG. 7, the cap for holding the pore height 134 may have a hollow shape. The inner diameter (d) of the cap for holding a pore height 134 may correspond to the diameter of the pores 132 and the height (h) may be suitably selected so as to prevent blocking of the pores 132 and maintain the height of the pores 132. It is possible to maintain the height of the pores 132 and prevent blocking of the air layer by applying the cap for holding the pore height 134 to the pores 132 of the perforated plate member 130.

Referring back to FIG. 3, the rear sound absorber 120 may be disposed on the rear surface of the perforated plate member 130 in the outer frame 140, that is, between the opening of the outer frame 140 and the perforated plate member 130. When the sound absorbing structure 100 is fixed to a wall, a ceiling and/or a floor, the opening of the outer frame 140 faces the wall, the ceiling and/or the floor. Accordingly, the rear sound absorber 120 may be disposed facing the wall, the ceiling and/or the floor where the sound absorbing structure 100 is fixed.

The rear sound absorber 120 may serve to enhance the sound absorbing effect of the perforated plate member 130 at the resonance frequency, and thus increase sound absorption in the wider frequency region including the resonance frequency and the frequency region near the resonance frequency.

If a porous sound absorber does not formed on the rear surface of the perforated plate member 130, the sound absorbing effect may be exhibited only in the specific frequency, that is, the resonance frequency of the perforated plate member 130. In this case, since the sound absorbing effect is exhibited in a narrow frequency region, it is difficult to use the sound absorbing structure universally. However, according to the embodiment of the present invention, it is possible to enhance the sound absorbing effect of the perforated plate member 130 so as to increase sound absorption in the wider frequency region including the resonance frequency and the frequency region near the resonance frequency by forming the rear sound absorber 120 on the rear surface of the perforated plate member 130.

The rear sound absorber 120 may include a porous sound absorber, and be formed of materials which are the same as or different from the front sound absorber 110.

Examples of the porous sound absorber which can be used for the rear sound absorber 120 may include an inorganic fiber such as glass wool, rock wool, ceramic wool, and the like, an organic fiber such as felt and the like, a chemical fiber such as polyester wool and the like, a foamed resin material such as polyurethane, melamine and the like and a sprayed fiber material, but are not limited thereto.

The thickness of the rear sound absorber 120 may vary depending on the resonance frequency of the perforated plate member 130. In a preferred embodiment, the thickness of the rear sound absorber 120 may be 50 to 250 mm. If the thickness of the rear sound absorber 120 is less than 50 mm, a sound absorbing ratio in the frequency region of 125 Hz or less may be significantly decreased so that it is difficult to use. Meanwhile, if the thickness of the rear sound absorber 120 is about 250 mm, it is possible to exhibit a sufficient sound absorbing effect up to the human audible range of 20 Hz. Therefore, it is meaningless to make the thickness of the rear sound absorber 120 greater than 250 mm.

The rear sound absorber 120 may be formed in a plate shape, for example in a plate shape such as a square plate or a rectangular plate.

Although it is not shown, a protective layer surrounding the rear sound absorber 120 may be further included in the surface of the rear sound absorber 120 in order to prevent scattering of the porous sound absorber. The protective layer may be formed of a glass fiber fabric, a polyester film and the like, but is not limited thereto.

The outer frame 140 may serve to protect the front sound absorber 110, the perforated plate member 130 and the rear sound absorber 120 and form a frame.

The outer frame 140 may be formed of any material suitable for performing such functions, preferably a metal.

The outer frame 140 may include the opening, and when the sound absorbing structure 100 is fixed to a wall, a ceiling and/or a floor, the opening of the outer frame 140 faces the wall, the ceiling and/or the floor.

The outer frame 140 may be formed of a porous plate. The porous plate may be a thin plate having a plurality of pores and have porosity, i.e., a ratio of the total area of pores to the area of the plate of 30 to 50%. This is to prevent absorption of the sound wave from being interfered due to the fact that sound is reflected off the surface of the porous plate. The lower limit of the porosity of the outer frame 140, i.e., 30% is the minimum range that does not recognize the surface as a resistor in the process of sound absorption, acoustically. And, it is practically difficult to make the maximum porosity greater than 50% in view of the manufacturing process for the porous plate.

The outer frame 140 may be formed in a plate shape, for example in a plate shape such as a square plate or a rectangular plate.

As shown in FIG. 3, the sound absorbing structure 100 in accordance with the embodiment of the present invention may be formed in a plate shape. The sound absorbing structure 100 in the plate shape may be fixed to a wall, a ceiling and/or a floor of an anechoic chamber such that the rear sound absorber 120 disposed near the opening of the outer frame 140 faces the surface of the wall, the ceiling and/or the floor of the anechoic chamber and the front sound absorber 110 disposed away from the opening of the outer frame 140 faces the interior of the anechoic chamber.

The sound absorbing structure 100 in accordance with the embodiment of the present invention is formed in the plate shape, thereby allowing efficient use of the internal space of the anechoic chamber. In a plurality of sound absorbing structures 100 that are applied to the anechoic chamber, the front sound absorbers 110 may be formed to have different thicknesses from each other and the rear sound absorbers 120 may be formed to have different thicknesses to have different thicknesses from each other. Moreover, it is possible to effectively exhibit the sound absorbing effect required according to the size of the anechoic chamber and acoustic characteristics by appropriately disposing the sound absorbing structures 100 including the front sound absorbers 110 having different thicknesses and the rear sound absorbers 120 having different thicknesses.

The sound absorbing structure 100 in accordance with the embodiment of the present invention can exhibit the sound absorbing effect in the low frequency region due to the resonance effect caused by vibration of the perforated plate member 130 and the effect of the rear sound absorber 120 for enhancing the resonance effect and increasing sound absorption at the resonance frequency and in the frequency region near the resonance frequency. Moreover, the sound absorbing structure 100 in accordance with the embodiment of the present invention can exhibit the sound absorbing effect in the high frequency region due to the effect of the front sound absorber 110. Further, the sound absorbing structure 100 in accordance with the embodiment of the present invention can also improve the sound absorbing effect in the middle frequency region by synthetizing such absorbing effects. The sound absorbing effect obtained by the sound absorbing structure 100 in accordance with the embodiment of the present invention will be explained in detail with reference to FIG. 8.

Figure 8:
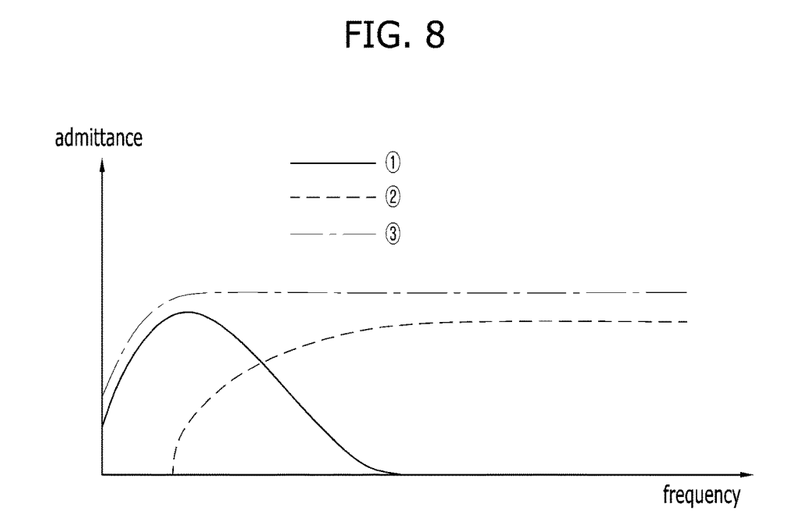
FIG. 8 is a graph for illustrating the sound absorbing effect of the sound absorbing structure in accordance with an embodiment of the present invention.

FIG. 8 is a graph for illustrating the sound absorbing effect of the sound absorbing structure in accordance with an embodiment of the present invention.

Referring to FIG. 8, the correlation between the frequency and the sound absorbing ratio is conceptually shown. ① is a graph showing the sound absorbing ratio due to the combination of the perforated plate member and the rear sound absorber, ② is a graph showing the sound absorbing ratio of the front sound absorber, and ③ is a graph showing the total sound absorbing ratio of the sound absorbing structure.

First, in the graph ② showing the sound absorbing ratio of the front sound absorber, the frequency where the sound absorbing ratio becomes a horizontal line indicates that the normal incidence sound absorbing ratio reaches 99% or more and it may be about 250 Hz when the thickness of the front sound absorber is about 200 mm to about 250 mm. Next, in the graph ①, it can be shown that the sound absorbing ratio is high around the position of the specific frequency due to the combination of the perforated plate member and the rear sound absorber. As described above, in the embodiment of the present invention, the specific frequency may be designed to be 125 Hz or less. Meanwhile, in the frequency region of about 125 Hz to about 250 Hz, the sound absorbing ratio of the front sound absorber indicated by ② is combined with the sound absorbing ratio due to the combination of the perforated plate member and the rear sound absorber indicated by ① so that an effect of increasing the curve may be obtained. Accordingly, the sound absorbing structure can have the normal incidence sound absorbing ratio of 99% or more at the frequency equal to or more than the specific frequency designed depending to the perforated plate member.

As a result, the sound absorbing structure in accordance with the embodiment of the present invention can exhibit the sound absorbing effect in the low frequency region due to the resonance effect caused by vibration of the perforated plate member and the effect of the rear sound absorber for enhancing the resonance effect and increasing sound absorption at the resonance frequency and in the frequency region near the resonance frequency. Further, the sound absorbing structure in accordance with the embodiment of the present invention can exhibit the sound absorbing effect in the high frequency region due to the effect of the front sound absorber and also improve the sound absorbing effect in the middle frequency region by synthetizing such absorbing effects.

The sound absorbing structure 100 in accordance with the embodiment of the present invention may be formed in a simple manner, for example, by sequentially disposing the front sound absorber 110, the perforated plate member 130 and the rear sound absorber 120 in the outer frame 140 through the opening of the outer frame 140. That is, since the sound absorbing structure 100 in accordance with the embodiment of the present invention may be formed by inserting each component in the outer frame 140 in the form of a basket without having to bond each component by using adhesives, the manufacturing process is easy and there is no possibility of causing a hazard problem due to the adhesives.

Moreover, since the sound absorbing structure 100 may be formed not by bonding methods but by inserting the front sound absorber 110, the perforated plate member 130 and the rear sound absorber 120 in the outer frame 140, kinds of the porous sound absorber used for the front sound absorber 110 and the rear sound absorber 120 are not limited. Further, it is possible to uniformly secure the performance of the anechoic chamber by achieving a uniform sound absorbing ratio.

The sound absorbing structure 100 in accordance with the embodiment of the present invention may be fixed to walls, ceilings and/or floors to form an anechoic chamber.

Figure 9:
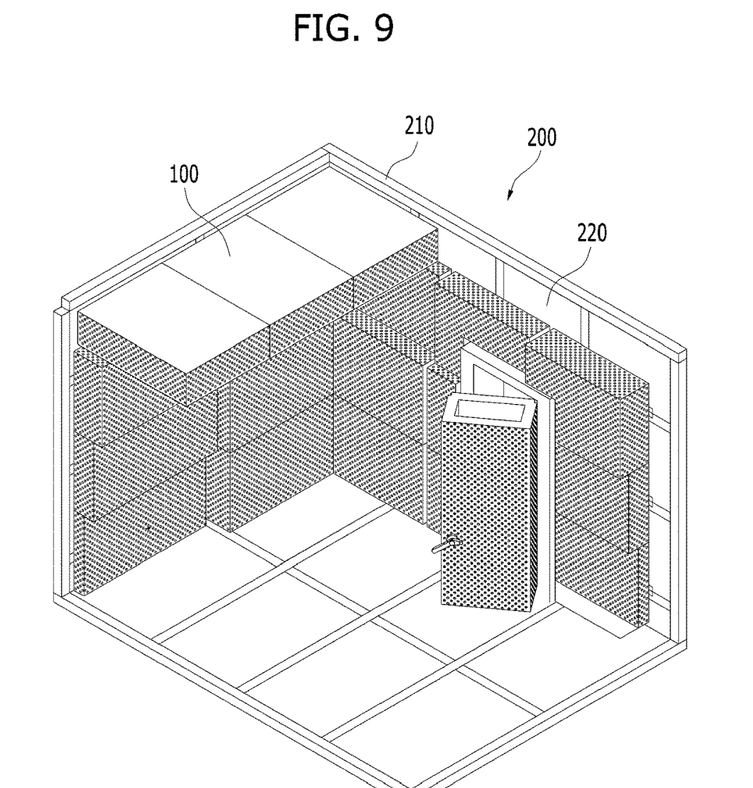
FIG. 9 is a schematic view of an anechoic chamber in accordance with an embodiment of the present invention.

FIG. 9 is a schematic view of an anechoic chamber in accordance with an embodiment of the present invention.

Referring to FIG. 9, an anechoic chamber 200 in accordance with the embodiment of the present invention may include a frame 210 formed in a grid shape on a wall, a ceiling and/or a floor, a sound insulating panel 220 formed in the space between the frames 210, and a plurality of sound absorbing structures 100 fixed to the wall and the ceiling.

According to ISO 3745, if the sound absorbing structure is installed throughout the wall, the ceiling and the floor, it may be defined as a full anechoic chamber, and if the sound absorbing structure is installed on the wall and the ceiling except for the floor, it may be defined as a hemi anechoic chamber. The embodiment of the present invention of FIG. 9 corresponds to the hemi anechoic chamber where the sound absorbing structures 100 are formed on the walls and the ceiling except for the floor. Although it is not shown, the anechoic chamber 200 in accordance with the embodiment of the present invention may include the full anechoic chamber where the sound absorbing structures 100 are formed throughout the wall, the ceiling and the floor.

The sound absorbing structure 100 may be fixed to the wall, the ceiling and/or the floor without adhesion, and the fixation may be performed by suitable methods among the known techniques in the field. For example, the sound absorbing structure 100 may be fixed to the wall and the like by coupling brackets to the outer frame 140, or by making the end portion of the outer frame 140 which is in contact with the walls and the like with a shape that can be hung on the walls and the like such as a "¬" shape. And, the sound absorbing structure 100 may be fixed to the wall and the like by hooking the outer frame 140 to the walls and the like. Meanwhile, the sound absorbing structure 100 may be directly fixed to the wall and the like, or may be fixed by using the frames 210 formed in a grid shape.

In accordance with the embodiment of FIG. 9, the anechoic chamber 200 includes the frames 210 in a grid shape and the sound insulating panel 220 formed in the space between the frames 210, and the sound absorbing structure 100 are disposed on the sound insulating panel 220.

Alternatively, in accordance with another embodiment, the anechoic chamber 200 may not include the frames 210 in a grid shape and the sound insulating panel 220 formed in the space between the frames 210, and the sound absorbing structure 100 may be directly fixed to the walls, the ceilings and/or the floors by using the methods as described above.

The anechoic chamber 200 may include the sound absorbing structures 100 throughout the walls, the ceilings and/or the floors so that sound generated in the anechoic chamber 200 can be absorbed by the sound absorbing structure 100 and noise due to sound reflection cannot occur.

Since the sound absorbing structure 100 included in the anechoic chamber 200 in accordance with the present invention is formed in a plate shape, the length of the sound absorbing structure 100 is reduced in comparison with the common wedge-type absorber, thereby allowing efficient use of the internal space of the anechoic chamber 200.

Moreover, in the plurality of sound absorbing structures 100 included in the anechoic chamber 200, the front sound absorbers 110 may be formed to have different thicknesses from each other and the rear sound absorbers 120 may be formed to have different thicknesses to have different thicknesses from each other. Moreover, it is possible to effectively exhibit the sound absorbing effect required according to the size of the anechoic chamber 200 and acoustic characteristics such as existence of room modes in a simple and easy manner by appropriately disposing the sound absorbing structures 100 including the front sound absorbers 110 having different thicknesses and the rear sound absorbers 120 having different thicknesses. As a result, it is possible to effectively meet the conditions of the free sound field Hereinbelow, the present invention will be described in more detail with reference to the following examples. These examples are provided only for illustration of the present invention and should not be construed as limiting the scope and spirit of the present invention.

EXAMPLE (1) Preparation of Test Materials

According to the common technology in the prior art, a sound absorbing structure of a comparative example was prepared by bonding a melamine sound absorber (100 mm), an iron plate (1 mm) and a polyester sound absorber (250 mm) with an adhesive in a porous outer frame having an opening. In contrary, a sound absorbing structure of an example was prepared by inserting a porous sound absorber (100 mm), a perforated iron plate (1 mm) having a plastic cap (diameter 10 mm, thickness 5 mm) formed in the pore and a polyester absorber (250 mm) in a porous outer frame having an opening.

(2) Test Method

The sound absorbing structures of the example and the comparative example were provided in a size of 1800 mm (width)×1200 mm (height)×350 mm (length) and tested according to KS F 2814-2 (Determination of sound absorption coefficient and impedance in impedance tubes). The test for a sound absorbing ratio was designed to generate resonance at 80 Hz in the pore.

(3) Test Result

Figure 10:
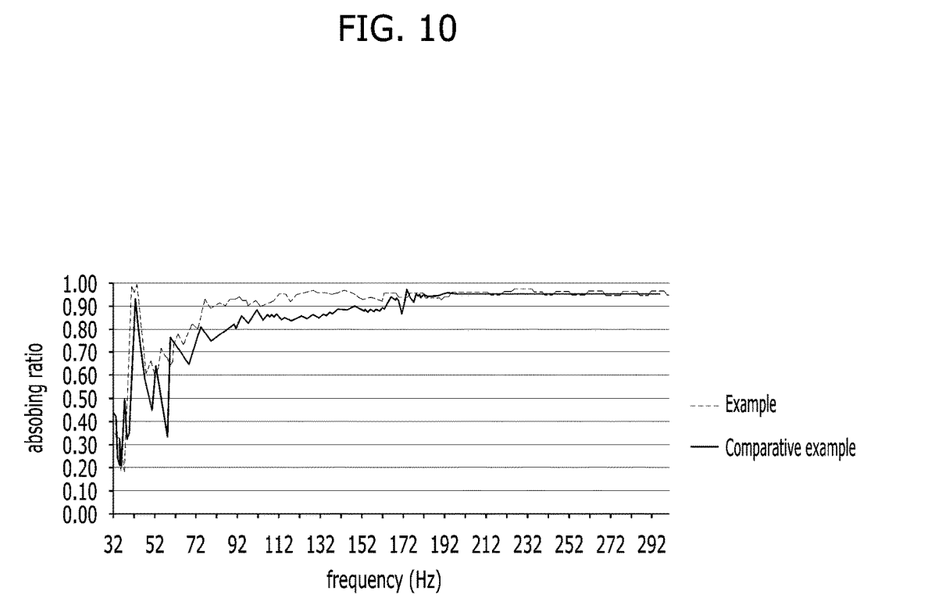
FIG. 10 is a graph for illustrating sound absorbing ratios in accordance with an example and a comparative example.

Results of the test for a sound absorbing ratio are shown in FIG. 10. As shown in FIG. 10, it is confirmed that the example has a sound absorbing ratio comparable with the comparative example in the high frequency region, and simultaneously has a sound absorbing ratio that is 0.1 to 0.15 higher than the comparative example in the low frequency region of 60 to 150 Hz.

Thus, the embodiment of the present invention can exhibit the sound absorbing effect in the low frequency region due to the resonance effect caused by vibration of the perforated plate member and the effect of the rear sound absorber for enhancing the resonance effect and increasing sound absorption at the resonance frequency and in the frequency region near the resonance frequency. Further, the sound absorbing structure can exhibit the sound absorbing effect in the high frequency region due to the effect of the front sound absorber and also improve the sound absorbing effect in the middle frequency region by synthetizing such absorbing effects. As a result, the whole sound absorbing ratio can be remarkably improved, thereby effectively securing performances of the anechoic chamber.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described. Other implementations, enhancements and variations can be made based on what is described and illustrated in this patent document.

What is claimed is:

1. A sound absorbing structure comprising:
an outer frame including an opening;
a perforated plate member formed in the outer frame, including a metal plate and including a rear surface facing the opening of the outer frame and a front surface opposite to the rear surface; and
a rear sound absorber interposed between the rear surface of the perforated plate member and the opening of the outer frame,
wherein the perforated plate member has a fundamental resonance frequency (fp$_0$) of 125 Hz or less, which is calculated according to the following equations:

$$f_{p0} = \sqrt{(9D\pi^2/4h\rho\xi^4)} \sqrt{\xi^2 L_x^2 + 3\xi^2 L_y^2 + 2\xi^2 + 2\xi^2(1-\sigma^2)}$$

$$\xi = \frac{(1-\mu)L_a L_b L_x L_y}{\pi r^2},$$

wherein
D: Flexural rigidity of the perforated plate member,
h: Thickness of the perforated plate member,
ρ: Volume density of the perforated plate member,
σ: Poisson's ratio of the perforated plate member,
μ: Porosity (ratio of a total cross-sectional area of pores to a cross-sectional area of the perforated plate member),
r: Radius of pores,
$L_a$: Horizontal pitch between pores,
$L_b$: Vertical pitch between pores,
$L_x$: Horizontal length of the perforated plate member, and
$L_y$: Vertical length of the perforated plate member.

2. The sound absorbing structure of claim 1, further comprising a front sound absorber interposed between the front surface of the perforated plate member and the outer frame.

3. The sound absorbing structure of claim 2, wherein the front sound absorber comprises a porous sound absorber.

4. The sound absorbing structure of claim 3, wherein the porous sound absorber comprises one or more selected from the group consisting of an inorganic fiber, an organic fiber, a chemical fiber, a foamed resin material and a sprayed fiber material.

5. The sound absorbing structure of claim 2, wherein the front sound absorber has a thickness greater than 0 mm and up to 350 mm.

6. The sound absorbing structure of claim 1, wherein the rear sound absorber comprises a porous sound absorber.

7. The sound absorbing structure of claim 6, wherein the rear sound absorber comprises one or more selected from the group consisting of an inorganic fiber, an organic fiber, a chemical fiber, a foamed resin material and a sprayed fiber material.

8. The sound absorbing structure of claim 1, wherein the rear sound absorber has a thickness of 50 to 250 mm.

9. The sound absorbing structure of claim 1, wherein the perforated plate member has a ratio of a total area of pores to an area of the plate of 1 to 15%.

10. The sound absorbing structure of claim 1, wherein the perforated plate member further comprises a cap for holding a pore height, wherein the cap for holding the pore height has a hollow shape and has a height which is equal to or greater than the pore height.

11. The sound absorbing structure of claim 1, wherein the outer frame comprises a porous plate in which pores are formed in the plate.

12. The sound absorbing structure of claim 1, wherein the outer frame has a ratio of a total area of pores to an area of the plate of 30 to 50%.

13. The sound absorbing structure of claim 1, wherein the sound absorbing structure has a plate shape.

14. The sound absorbing structure of claim 1, wherein the perforated plate member absorbs sound due to resonance caused by vibration of the plate and resonance caused by vibration of air inside pores.

15. An anechoic chamber comprising:
a wall, a ceiling and a floor; and
a plurality of sound absorbing structures of claim 1 fixed to at least the wall and the ceiling.

16. The anechoic chamber of claim 15, wherein the plurality of sound absorbing structures are fixed to all of the wall, the ceiling and the floor.

* * * * *